though exists 2,889,385
Patented June 2, 1959

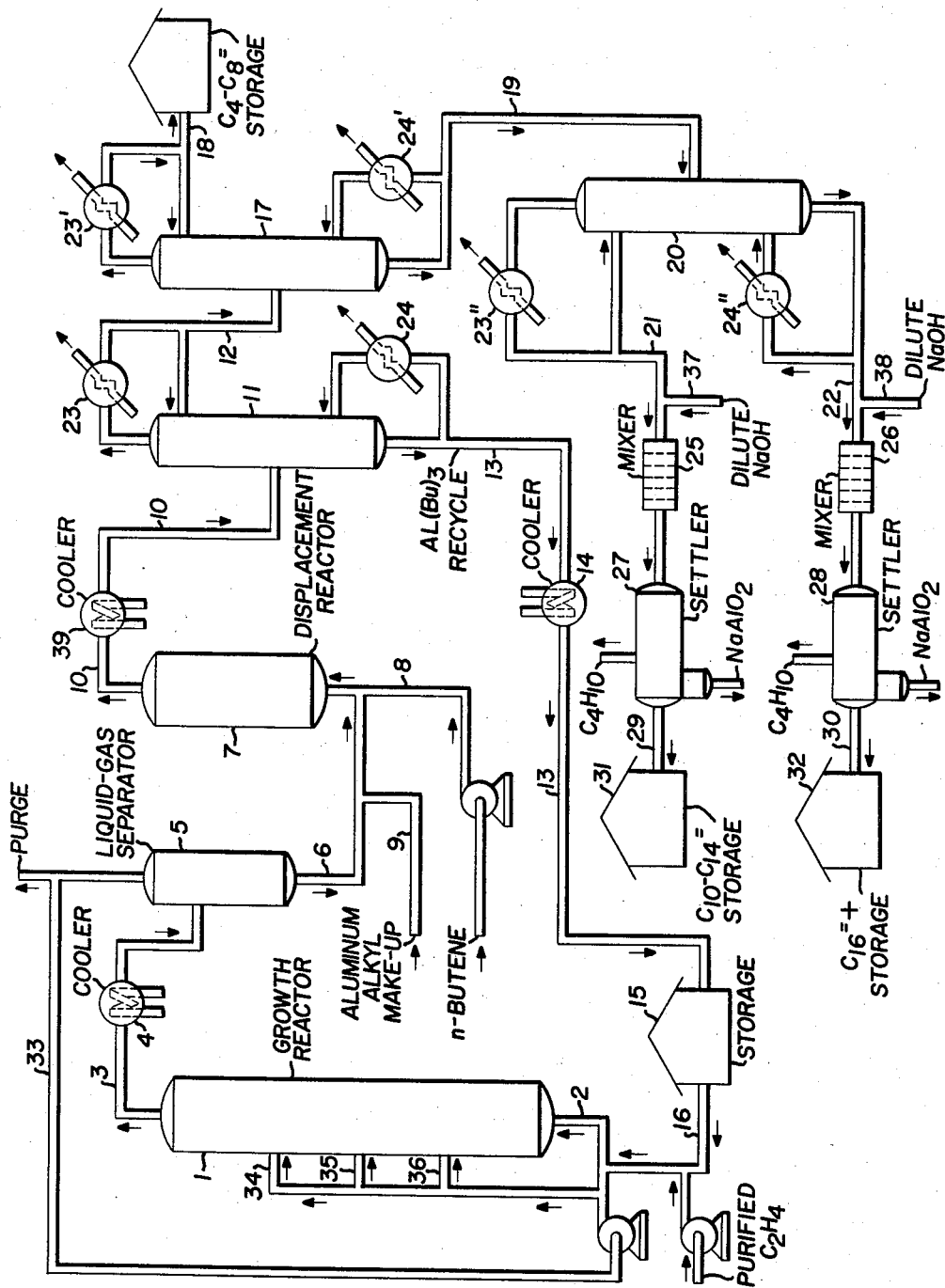

2,889,385

PREPARATION OF LONG CHAIN OLEFINS FROM ALUMINUM TRIALKYL AND ETHYLENE

William E. Catterall, Summit, and Donald W. Wood, Highland Park, N.J., assignors to Esso Research and Engineering Company, a corporation of Delaware Application April 10, 1956, Serial No. 577,335

7 Claims. (Cl. 260—683.15)

The present invention relates to the preparation of $C_4$–$C_{16}$ and higher olefins. More particularly, this invention relates to a novel process for the production of straight-chain alpha olefins by first growing a low molecular weight alkene onto a low molecular weight straight-chain aluminum trialkyl and then displacing the resulting higher molecular weight alkyl radicals of the aluminum trialkyl with certain low molecular weight alkenes to generate olefins.

Under certain reaction conditions lower alkenes, such as ethene, may be grown onto low molecular weight aluminum trialkyls, such as aluminum triethyl, to form an aluminum trialkyl whereby the alkyl radicals have an increased number of carbon atoms. For example, when ethene is reacted or grown onto aluminum triethyl under certain temperatures and pressures, the resulting product will be a mixture of aluminum trialkyls wherein the alkyl groups contain even numbers of 4–16 and more carbon atoms. A typical product from such a reaction at 200° F. and 1500 p.s.i. of ethene partial pressure contains the following aluminum compounds:

| | Weight percent |
|---|---|
| $Al(C_4H_9)_3$ | 20.3 |
| $Al(C_6H_{13})_3$ | 27.8 |
| $Al(C_8H_{17})_3$ | 24.8 |
| $Al(C_{10}H_{21})_3$ | 13.7 |
| $Al(C_{12}H_{25})_3$ | 6.0 |
| $Al(C_{14}H_{29})_3$ | 4.7 |
| Al(higher alkyls)$_3$ | 2.7 |

The product distribution, however, can be varied considerably by modifying reaction time, temperature, pressure and proportions of feed, e.g., aluminum alkyl to ethene ratio.

In any event when ethene is employed as the growth reagent the carbon atom length of the alkyl chains is increased in multiples of two. Other low molecular weight alkenes, such as propene and butene, may also be used as growth reagents and these reactants will generally effect an increase in the alkyl chain in multiples of three and four respectively. However, alkenes above ethene are not particularly preferred as growth reagents since they are less reactive and tend to form branched chain radicals rather than the desired straight chain alkyl groups. These branched radicals break off easily to form olefins according to the following illustrative equations:

(1) $Al(C_2H_5)_3 + 3C_4H_8 \longrightarrow$ 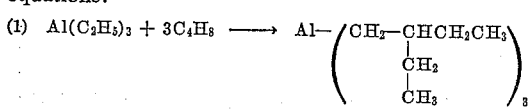

(2)
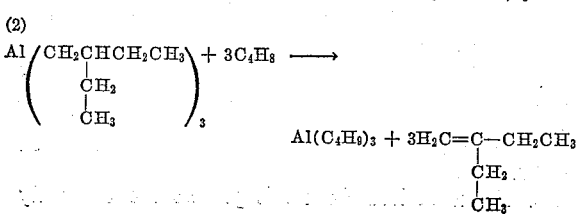

Eventually, the aluminum triethyl is all converted to aluminum tri-n-butyl. The reactions then most likely proceed as follows:

(3) $Al(C_4H_9)_3 + 3C_4H_8 \longrightarrow$ 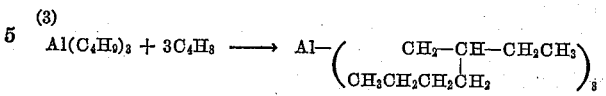

(4) 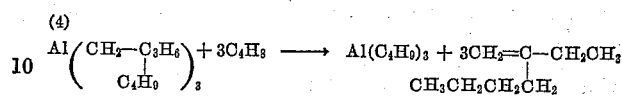

With alkenes higher than ethene the reaction might more correctly be called olefin dimerization rather than alkyl growth.

The mixture of aluminum trialkyls formed in the so-called growth stage may then be reacted with a low molecular weight alkene to effect a displacement of the higher molecular weight alkyl radicals in the aluminum trialkyls as typified by the following type reaction:

$Al(C_4\text{--}C_{16+} \text{ alkyl})_3 + 3C_2H_4 \longrightarrow$
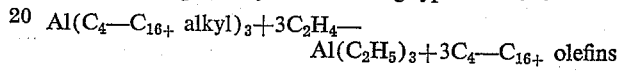

It would seem that the resulting product mixture containing the $C_{4-16+}$ olefins and aluminum triethyl could then be fractionated to recover olefins and aluminum triethyl suitable for reuse in the growth stage. However, aluminum triethyl has a boiling point very close to the $C_{12}$ straight chain olefin. Consequently, fractionation of the product mixture will result in obtaining a relatively pure low molecular weight cut, e.g., $C_4$–$C_8$ olefins, a relatively pure high molecular weight cut, e.g., $C_{16+}$ olefins, and an intermediate cut containing $C_{10}$–$C_{14}$ olefins contaminated with aluminum triethyl. To effect a separation of the valuable $C_{10}$–$C_{14}$ straight chain alpha olefins, this intermediate cut can be passed to a second growth reactor wherein under carefully controlled conditions the aluminum triethyl may be reacted with ethene in a manner similar to that in the first growth stage to produce a higher boiling aluminum trialkyl, e.g., aluminum tri-butyl. The thus reacted intermediate cut is then fractionated in a known manner to produce overhead the relatively pure $C_{10}$–$C_{14}$ olefins and as a bottoms product the aluminum tributyl for reuse.

It is well known that lower molecular weight aluminum trialkyls, and especially aluminum triethyl, are extremely dangerous to handle since they are prone to spontaneous combustion when in contact with air. Also, direct contact with water which may occur as a result of some cooling procedures must be avoided due to the explosive reaction of aluminum trialkyls with water.

Besides the safety factors involved, it is readily seen that a process requiring two growth stages leaves much to be desired. From a practical standpoint the inclusion of a second growth stage adds considerably to the cost of producing olefins due to the additional equipment and control necessary for this stage.

It is therefore a primary object of this invention to provide a process for preparing certain olefins by the growth of ethene onto low molecular weight aluminum trialkyls and the subsequent displacement with an alkene without resort to a second growth stage.

It has now been discovered that olefins, especially straight chain alpha olefins, may be prepared by a process which requires only one growth stage. In order to accomplish this result by the present process, it is necessary to use as the displacing reagent a compound which will react to form an aluminum trialkyl having a boiling point higher than the boiling point of the desired olefin product. For example when $C_4$ to $C_{16}$ olefins are desired, a low molecular weight aluminum tri-n-alkyl is reacted with ethene under certain reaction conditions to produce a higher molecular weight aluminum trialkyl wherein the alkyl radicals contain from 4 to 16 carbon atoms. This aluminum trialkyl Al($C_4$–$C_{16}$)$_3$ is then reacted with a lower alkene, to generate the olefins. However, the lower alkene must be of sufficient molecular weight to form an aluminum trialkyl having a boiling point above those of the generated $C_4$ to $C_{16}$ olefins. Separation may then be accomplished by any conventional fractionating technique.

Although other alkenes such as propene and pentene may be used as the displacing reagent, n-butene and especially n-butene-1 are preferred since the n-butenes are particularly amenable to a continuous process such as that described below.

This invention will now be described in greater detail with reference to the flow sheet drawing which shows an embodiment of this process.

Aluminum tri-n-butyl and purified ethene, which may contain about 2% ethane, are passed to the growth reactor 1 through line 2. In the place of aluminum tri-n-butyl, other aluminum alkyls such as aluminum tripropyl and aluminum triethyl may be used. The growth reactor may be a pressure unit similar to those conventionally employed in the well known oxo or carbonylation process. Reactor 1 preferably contains several sections packed with ceramic Raschig rings or other suitable material for obtaining good liquid-gas contact. Due to the high heat of reaction, it is necessary to control the temperature within the reactor, and one method contemplated is by interstage cooling with recycle ethene-ethane gas, as shown by lines 34, 35 and 36. Cold liquid product may also be used as a coolant if desired. In order to effect a buildup or growth of ethene onto aluminum tri-n-butyl certain temperature and pressure conditions must be maintained. Generally, temperatures between 185° F. to 260° F., and ethene partial pressures between 300 p.s.i.g. to 3000 p.s.i.g. may be employed; however, preferred conditions are 210° F. to 230° F., and 1200 p.s.i.g. to 3000 p.s.i.g. ethene partial pressure.

In any case, temperature control is important in the growth stage since above about 260° F. the displacement reaction begins to be significant and higher molecular weight aluminum alkyls forming within the growth reactor may react with ethene to prematurely form aluminum triethyl and olefins. The prematurely formed olefins can also react with aluminum alkyls forming higher molecular weight branched olefins. These undesirable side reactions are illustrated below:

(1)  $Al(C_4H_9)_3 + 3C_2H_4 \rightarrow Al(C_2H_5)_3 + 3C_4H_8$ (2)
$Al(C_6H_{13})_3 + 3C_4H_8 + 3C_2H_4 \longrightarrow$

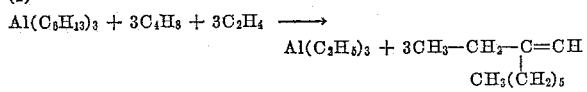

The undesirable formation of branched chain olefins in the growth reactor as typified by Equation 2 may be considerable; however, such side reactions as indicated above can be suppressed by control of the temperature within the reactor.

It is not absolutely necessary to employ straight-chain aluminum trialkyls such as aluminum tri-n-butyl as the growth stage reactant. For example, aluminum triisobutyl might be used. Initially ethene would displace the $C_4$ radicals producing aluminum triethyl and isobutylene. From then on, ethylene would grow onto the aluminum triethyl. The high molecular weight aluminum alkyls and isobutylene leaving the growth reactor would be fed to the displacement stage. Under the conditions existing in the displacement stage, isobutylene would displace the long straight chain radicals forming the corresponding olefins and aluminum triisobutyl for reuse. The ethene pressure in part will determine the extent of growth that occurs and accordingly the amount of reactants employed may be adjusted to produce the desired olefins. For example, to obtain a $C_4$–$C_{16+}$ olefin product, 3 to 24 moles of ethene per mole of aluminum tri-n-butyl should be employed. Residence times are generally in the range of 1 to 9 hours.

The higher molecular weight aluminum trialkyls together with unreacted ethene and ethane diluent are then passed via line 3 through cooler 4 to a high pressure liquid-gas separator 5 where ethene and ethane are purged to keep the ethane concentration within a reasonable limit, for example 50%. The cold ethene-ethane mixture recovered from the liquid-gas separator may be recycled via line 33 to various points of growth reactor 1 for proper temperature control. Higher molecular weight aluminum alkyls are then passed via line 6 to the displacement reactor 7 to which n-butene-1 and, if desired, make-up aluminum such as aluminum tri-n-butyl, tri-isobutyl, aluminum dialkyl hydride, aluminum monoalkyl dihydride, aluminum hydride, etc., may be passed via lines 8 and 9 respectively. Within the displacement reactor 7, under certain reaction conditions and catalysis, the n-butene displaces the alkyl radicals of the aluminum trialkyls to generate olefins and aluminum tri-n-butyl or in the case of isobutene, aluminum tri-isobutyl. Temperatures and pressures to be maintained in displacement reactor 7 are 100° F. to 230° F. and 0 p.s.i.g. to 3000 p.s.i.g. Nickel supported on an inert carrier such as kieselguhr, alumina, silica, etc., or a Raney nickel type have been found to be especially effective catalysts for the displacement reaction. However, in general, the metals of the first transition series, as well as the platinum group metals, will also catalyze the desired displacement reaction. These catalysts may be supported on the inert carriers mentioned above or used as finely divided suspensions. When used in the finely divided condition, the catalysts are more effective in promoting the displacement reaction than when supported on a carrier. Supported catalysts may be of the well known commercial type containing 5–60% of active material. Preferably from 0.5 to 20 lb. feed/hr./lb. active component is employed.

Since the lower molecular weight aluminum trialkyls are somewhat dangerous to handle, certain safety features are desirably employed. In the growth and displacement reactors 1 and 7, an inert diluent such as olefin, paraffin, or aromatic compounds is preferably used in order to avoid the possibility of spontaneous combustion. Typical diluents which may be employed are hexane, heptane, benzene, toluene, hexene, heptene and the like. Also water cooling should preferably be eliminated in these reactors since the aluminum trialkyls react explosively with water in case of leakage through heat exchangers.

The resulting aluminum tributyl and $C_4$–$C_{16+}$ straight-chain alpha olefins are then led from reactor 7 via line 10 through cooler 39 to a conventional fractionating tower or unit 11 where said olefins are taken overhead via line 12. Aluminum tri-n-butyl, as a bottoms cut, is removed via line 13 to cooler 14 then to a storage tank 15 from whence it may be used as recycle aluminum tri-n-butyl to be led to growth reactor 1 via line 16.

The olefins taken overhead are then fractionated in unit 17 to recover overhead through line 18 $C_4$–$C_8$ straight chain alpha olefins. The bottoms product substantially free from aluminum alkyl containing the $C_{10}$–$C_{16+}$ olefins is passed, via line 19 to fractionating tower 20 where $C_{10}$–$C_{14}$ and $C_{16+}$ (e.g. up to $C_{20}$) cuts are recovered through lines 21 and 22 respectively. Fractionating towers 11, 17 and 20 may contain conventional reflux 23 and reboiler 24 equipment. To eliminate any traces of aluminum trialkyl which may be entrained in the olefin cuts from fractionator 20, dilute NaOH may be added at 37 and 38. The olefin streams are passed through mixers 25 and 26, then to settlers 27 and 28 from which alkane gas, e.g. butane and $NaAlO_2$ are rejected. The thus purified olefins accordingly may then be passed via lines 29 and 30 to storage units 31 and 32.

The olefins derived from this process are extremely valuable as intermediates for producing straight-chain plasticizer and detergent range alcohols, in addition to straight chain aldehydes and acids.

It is apparent from the above described process that the need for a second controlled growth step is completely eliminated.

To further illustrate the present invention, specific operative conditions of a continuous aluminum alkyl-olefin process are set forth below:

EXAMPLE

Growth reactor

| | |
|---|---|
| Temperature, °F. | 230 |
| Pressure, p.s.i.g. | 3000 |
| $C_2H_4$ partial pressure, p.s.i.g. | 2000 |
| Residence time, hrs. | 3 |

Composition of alkyl growth product

| | Mole percent |
|---|---|
| $Al(C_4H_9)_3$ | 1.0 |
| $Al(C_6H_{13})_3$ | 24.0 |
| $Al(C_8H_{17})_3$ | 31.4 |
| $Al(C_{10}H_{21})_3$ | 21.0 |
| $Al(C_{12}H_{25})_3$ | 11.2 |
| $Al(C_{14}H_{29})_3$ | 7.1 |
| Al(higher alkyls)$_3$ | 4.3 |

Displacement reactor

| | |
|---|---|
| Temperature, °F. | 170. |
| Pressure, p.s.i.g. | 150. |
| Residence time, hrs. | 2. |
| Catalyst | 15% Ni on kieselguhr. |
| Lbs. feed/hr./lb. Ni | 5. |

Composition of product from displacement reactor

| | Mole percent |
|---|---|
| $Al(C_4H_9)_3$ | 25.1 |
| $C_6H_{12}$ | 18.1 |
| $C_8H_{16}$ | 23.7 |
| $C_{10}H_{20}$ | 15.8 |
| $C_{12}H_{24}$ | 8.5 |
| $C_{14}H_{28}$ | 5.4 |
| Higher olefins | 3.4 |

The following table illustrates the amount of reactants required in parts by weight for the above continuous process:

| | |
|---|---|
| Ethylene consumption | 65 |
| n-Butene consumption | 50 |
| $Al(nC_4)_3$ circulation rate | 58 |
| $Al(nC_4)_3$ make-up | 0.5 |

It is to be understood that the above process is amenable also to semi-continuous and batch methods, both of which are now apparent from the detailed description given above.

What is claimed is:

1. A process for producing straight chain alpha olefins having 10 to 14 carbon atoms which comprises reacting ethene with aluminum tributyl under elevated temperatures and pressures to form a mixture of higher molecular weight aluminum trialkyls, said mixture containing $C_{10}$–$C_{14}$ alkyl radicals separating unreacted gases from the mixture, reacting said mixture containing $C_{10}$–$C_{14}$ alkyl radicals with butene under elevated temperatures and pressures in the presence of a catalyst whereby the butene displaces the $C_{10}$–$C_{14}$ alkyl radicals of said aluminum trialkyls to form a mixture of aluminum tributyl and $C_{10}$–$C_{14}$ straight chain alpha olefins, and separating said olefins from said mixture.

2. A process in accordance with claim 1 wherein n-butene is employed to displace the $C_{10}$–$C_{14}$ alkyl radicals.

3. A process in accordance with claim 1 wherein isobutene is employed to displace the $C_{10}$–$C_{14}$ alkyl radicals of said higher molecular weight aluminum trialkyls.

4. A continuous process for the production of $C_{10}$–$C_{14}$ olefins which comprises passing ethene and a low molecular weight aluminum trialkyl into a reaction zone, maintaining temperatures and pressures of 185°–260° F. and 300–3000 p.s.i.g. within said zone, thereby effecting a growth of said ethene onto said low molecular weight aluminum trialkyl to form a product mixture including aluminum trialkyls containing $C_{10}$–$C_{14}$ alkyl radicals, passing the higher molecular weight aluminum trialkyl containing $C_{10}$–$C_{14}$ alkyl radicals to a displacement zone containing a displacement catalyst, introducing into said zone butene, maintaining temperatures and pressures within said zone of 100°–230° F. and 0–3000 p.s.i.g., thereby displacing the higher molecular weight alkyl radicals with butene to generate a mixture containing $C_{10}$–$C_{14}$ olefins, passing the resultant mixture containing aluminum tributyl and $C_{10}$–$C_{14}$ olefins from said zone to a separation zone and separating said $C_{10}$–$C_{14}$ olefins from said aluminum tributyl.

5. A process in accordance with claim 4 wherein said butene which is introduced into the displacement zone is n-butene.

6. A process in accordance with claim 4 wherein said butene which is introduced into the displacement zone is isobutene.

7. A continuous process for the production of $C_{10}$–$C_{14}$ olefins which comprises passing ethene and a low molecular weight aluminum trialkyl, each alkyl radical containing from 2–4 carbon atoms, into a reaction zone, maintaining temperatures and pressures of about 185°–260° F. and 300–3000 p.s.i.g. within said zone, thereby effecting a growth of said ethene onto said low molecular weight aluminum trialkyl to form a product mixture including aluminum trialkyls containing $C_{10}$–$C_{14}$ alkyl radicals, cooling and passing said product mixture to a liquid-gas separation zone, separating gases containing ethene and ethane and introducing said gases into the reaction zone in amounts sufficient to control the temperature therein, reacting the higher molecular weight aluminum trialkyls with butene in the presence of a displacement catalyst at elevated temperatures and pressures, thereby displacing $C_{10}$–$C_{14}$ alkyl radicals with butene to generate $C_{10}$–$C_{14}$ olefins, and separating said $C_{10}$–$C_{14}$ olefins from said aluminum tributyl by fractionating the mixture.

References Cited in the file of this patent

UNITED STATES PATENTS

| | | |
|---|---|---|
| 2,695,327 | Ziegler et al. | Nov. 23, 1954 |
| 2,699,457 | Ziegler et al. | Jan. 11, 1955 |

OTHER REFERENCES

"Catalysis," Berkman et al., published by Reinhold Publishing Corp., New York (1940), pages 721–722.